United States Patent
Wei et al.

(10) Patent No.: US 9,429,710 B2
(45) Date of Patent: Aug. 30, 2016

(54) SILICON WAVEGUIDE HAVING POLARIZATION INSENSITIVE AND TEMPERATURE INSENSITIVE PHASE DELAY

(71) Applicant: Futurewei Technologies, Inc., Plano, TX (US)

(72) Inventors: Hongzhen Wei, Pleasanton, CA (US); Xiao Andy Shen, San Bruno, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 0 days.

(21) Appl. No.: 14/528,994

(22) Filed: Oct. 30, 2014

(65) Prior Publication Data

US 2015/0117809 A1    Apr. 30, 2015

Related U.S. Application Data

(60) Provisional application No. 61/897,441, filed on Oct. 30, 2013.

(51) Int. Cl.
*G02B 6/00* (2006.01)
*G02B 6/293* (2006.01)

(52) U.S. Cl.
CPC ......... *G02B 6/29302* (2013.01); *G02B 6/2935* (2013.01); *G02B 6/29397* (2013.01); *G02B 6/29398* (2013.01); *G02B 6/29353* (2013.01)

(58) Field of Classification Search
None
See application file for complete search history.

(56) References Cited

U.S. PATENT DOCUMENTS

| | | | |
|---|---|---|---|
| 5,694,496 A * | 12/1997 | Ando | C08G 73/1039 385/11 |
| 6,347,165 B1 | 2/2002 | Hyun et al. | |
| 2005/0089263 A1* | 4/2005 | Wessel | G02F 1/0955 385/14 |
| 2009/0003757 A1 | 1/2009 | Mizumoto et al. | |
| 2009/0110344 A1* | 4/2009 | Little | G02B 6/12007 385/11 |
| 2011/0103736 A1 | 5/2011 | Hashizume et al. | |
| 2011/0142396 A1 | 6/2011 | Okamoto | |

OTHER PUBLICATIONS

International Search Report; Dated Jan. 29, 2015; 1 page; PCT/US 14/63206.

\* cited by examiner

*Primary Examiner* — Uyen Chau N Le
*Assistant Examiner* — Chad Smith
(74) *Attorney, Agent, or Firm* — Futurewei Technologies, Inc.

(57) ABSTRACT

An apparatus includes a first waveguide configured to receive an input signal. A section of the first waveguide has a length between a first initial point and a first end point. A first polarization rotator is located within the section at a first distance from the first initial point of the section of the first waveguide. A section of a second waveguide is configured to receive the input signal, and has the same length between the second initial point and a second end point. A second polarization rotator is located within the section of the second waveguide at a second distance from the second initial point of the section of the second waveguide. More particularly, a relative distance between the first distance and the second distance is configured to achieve a desired phase delay of an output signal from the first waveguide and an output signal from the second waveguide.

20 Claims, 7 Drawing Sheets

SILICON WAVEGUIDE HAVING POLARIZATION INSENSITIVE AND TEMPERATURE INSENSITIVE PHASE DELAY

CROSS REFERENCE TO RELATED APPLICATIONS

The present application claims priority to and the benefit of the commonly owned, provisional patent application, U.S. Ser. No. 61/897,441, entitled "SILICON WAVEGUIDE HAVING POLARIZATION INSENSITIVE AND TEMPERATURE INSENSITIVE PHASE DELAY," with filing date Oct. 30, 2013, which is herein incorporated by reference in its entirety.

BACKGROUND

Silicon waveguides have large birefringence, which makes the waveguide highly polarization dependent. As a result, silicon photonic devices, such as sub-micron silicon photonics devices are strongly polarization dependent.

In addition, the silicon in silicon photonic devices has a large thermo-optical coefficient. As a result, silicon photonic devices, such as photonics filters, experience a large wavelength shift due to a variation of the ambient temperature. In order to stabilize a waveguide, a constant temperature environment is required. However, temperature control is achieved through additional power consumption.

There is a great interest in achieving polarization insensitive and temperature insensitive phase delay in a silicon photonic device including one or more waveguides.

SUMMARY

In some embodiments of the present invention, an apparatus is described. The apparatus includes a section of a first waveguide configured to receive an input signal at a first initial point. The section of the first waveguide has a length (e.g., L) between the first initial point and a first end point. The apparatus includes a first polarization rotator located within the section of the first waveguide. The first polarization rotator is located at a first distance from the first initial point of the section of the first waveguide. The apparatus includes a section of a second waveguide configured to receive the input signal at a second initial point. The section of the second waveguide has the length between the second initial point and a second end point. The apparatus includes a second polarization rotator located within the section of the second waveguide. The second polarization rotator is located at a second distance from the second initial point of the section of the second waveguide. More particularly, a relative distance between the first distance and the second distance is selectable to achieve a desired phase delay of an output signal from the first waveguide and an output signal from the second waveguide.

In another embodiment, an apparatus is described. The apparatus includes a section of a first waveguide configured to receive an input signal at a first initial point. The section of the first waveguide has a length (e.g., L) between the first initial point and a first end point. The apparatus includes a first polarization rotator located within the section of the first waveguide. The first polarization rotator is located at a first distance from the first initial point of the section of the first waveguide. The apparatus includes a section of a second waveguide configured to receive the input signal at a second initial point. The section of the second waveguide has the length between the second initial point and a second end point. The apparatus includes a second polarization rotator located within the section of the second waveguide. The second polarization rotator is located at a second distance from the second initial point of the section of the second waveguide. More particularly, a relative distance between the first distance and the second distance is selectable to achieve a desired phase delay of an output signal from the first waveguide and an output signal from the second waveguide. A first 3 dB coupler is coupled to the first waveguide at the first initial point and coupled to the second waveguide at the first end point. A second 3 dB coupler is coupled to the second waveguide at the second initial point, and coupled to the second waveguide at the second end point.

In another embodiment, an apparatus is described. The apparatus includes a section of a first waveguide configured to receive an input signal at a first initial point. The section of the first waveguide has a length (e.g., L) between the first initial point and a first end point. The apparatus includes a first polarization rotator located within the section of the first waveguide. The first polarization rotator is located at a first distance from the first initial point of the section of the first waveguide. The apparatus includes a section of a second waveguide configured to receive the input signal at a second initial point. The section of the second waveguide has the length between the second initial point and a second end point. The apparatus includes a second polarization rotator located within the section of the second waveguide. The second polarization rotator is located at a second distance from the second initial point of the section of the second waveguide. More particularly, a relative distance between the first distance and the second distance is selectable to achieve a desired phase delay of an output signal from the first waveguide and an output signal from the second waveguide. The apparatus includes a section of a third waveguide configured to receive the input signal at a third initial point, wherein the section of the third waveguide has the length between the third initial point and a third end point. The apparatus includes a third polarization rotator located within the section of the third waveguide, wherein the third polarization rotator is located at a third distance from the third initial point of the section of the second waveguide. In particular, a relative distance between the first distance and the third distance is a factor of n times the relative distance between the first distance and said second distance, wherein n is an integer.

In still another embodiment, a method is described. The method includes receiving an input signal at a first initial point of a section of a first waveguide, wherein the section of the first waveguide comprises a length between the first initial point and a first end point. The method includes rotating a polarization on the input signal at a first polarization rotator located within the section of the first waveguide, wherein the first polarization rotator is located at a first distance from the first initial point of the section of the first waveguide. The method includes receiving the input signal at a second initial point of a section of a second waveguide, wherein the section of the second waveguide comprises the length between the second initial point and a second end point. The method includes rotating a polarization on the input signal at a second polarization rotator located within the section of the second waveguide, wherein the second polarization rotator is located at a second distance from the second initial point of the section of the second waveguide. A relative distance between the first distance and the second distance is configured to achieve a desired phase delay of an output signal from the first waveguide and an output signal from the second waveguide These and other objects and advantages of the various embodiments of the present disclosure will be recognized by those of ordinary skill in the art after reading the following detailed description of the embodiments that are illustrated in the various drawing figures.

BRIEF DESCRIPTION

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Accordingly, embodiments of the present invention provide for polarization insensitive phase delay in highly bire- fringent silicon waveguide structures. Also, the waveguide structures can be configured to be temperature insensitive. As such, there is no need for temperature control on a corresponding chip or integrated circuit.

Asymmetric Mach-Zehnder (MZI) is a typical optical filter structure. The MZI can include two 3 dB couplers, one on each side, and asymmetric arms introducing a phase delay. The phase delay is decided by Equation 1, as follows:

$$\Delta\phi = \frac{2\pi}{\lambda}\Delta nL \tag{1}$$

In Equation 1, $\lambda$ is the wavelength, and $\Delta nL$ is the optical path difference between the asymmetric arms. The filter central wavelength is decided by Equation 2, below. In Equation 2, $n_g = n_e - \lambda(dn_e/d\lambda)$ is the group index, and $n_e$ is the effective index.

$$\Delta n_g L = \lambda^2 / FSR \tag{2}$$

Usually, the waveguides of the asymmetric arms have the same waveguide structure but different lengths. Because the effective index of the waveguide is polarization sensitive and temperature sensitive, the central wavelength of the filter is polarization dependent and temperature dependent.

Figure 1:
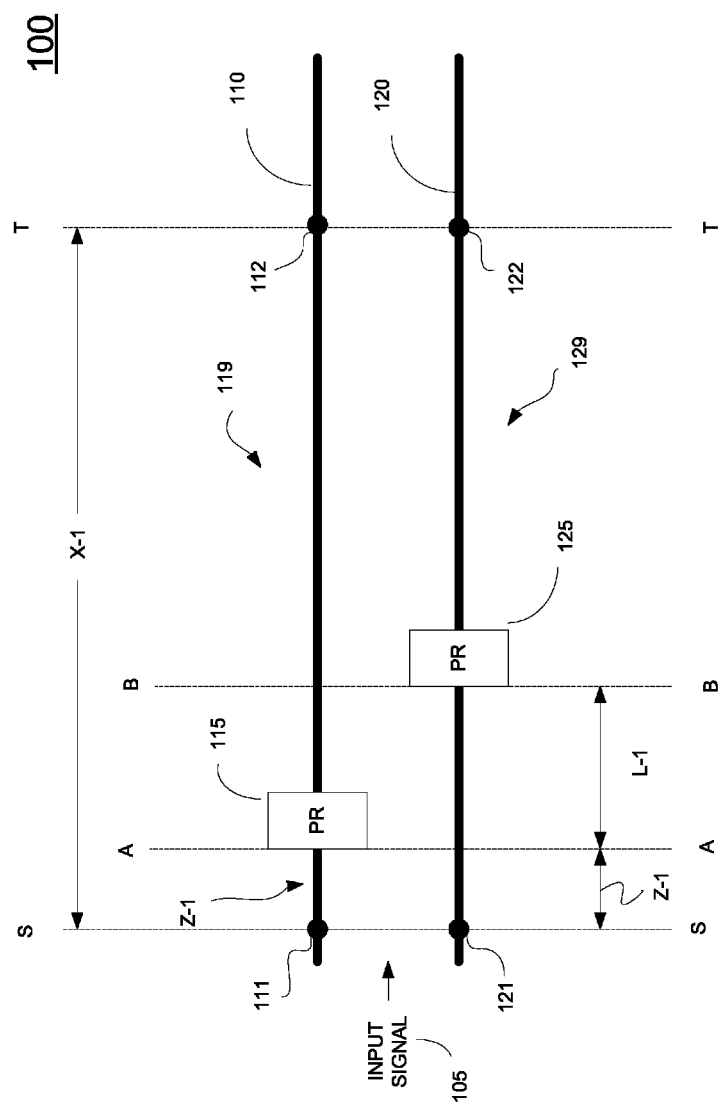
FIG. 1 is an illustration of a silicon photonic device including a two phase waveguide configured to be polarization independent, in accordance with one embodiment of the present disclosure.

FIG. 1 is an illustration of a silicon photonic device 100 including a two phase waveguide configured to be polarization independent, in accordance with one embodiment of the present disclosure. The photonic device 100 is polarization independent, or in other words polarization insensitive.

The silicon photonic device 100 includes a first waveguide 110 configured to receive an input signal at a first initial point 111. In one embodiment, the first waveguide 110 comprises silicon. A section 119 of the first waveguide 110 is defined between the first initial point 111 and a first end point 112, and is configured to receive the input signal 105. For example, the input signal 105 is received at the first initial point 111. The section 119 of the first waveguide 110 has a length between the first initial point and a first end point, shown between line S-S and line T-T. The length is generically referenced as "X-1".

The input signal can be defined as having a polarization mode, wherein a first polarization mode is orthogonal to a second polarization mode. For instance, a transverse mode of a beam of electromagnetic radiation traveling through a waveguide defines a pattern of radiation measured in a plane perpendicular (e.g., transverse) to the direction of propagation of the beam. As such, a wave of a particular frequency traveling through a boundary of a waveguide can be described in one more transverse modes. One mode is defined as transverse electric (TE), wherein there is no electric field in the direction of propagation. The TE mode is also described as H mode, because there is a component of the magnetic field (defined by H) along the direction of propagation. Another mode is defined as transverse magnetic (TM), wherein there is no magnetic field in the direction of propagation. The TM mode is also described as an E mode because there is component of the electric field (defined by E) along the direction of propagation. In one embodiment, the input signal has a TM polarization. In another embodiment, the input signal has a TE polarization. The TE polarization mode is orthogonal to the TM polarization mode, in one embodiment.

A first polarization rotator 115 is located within the section 119 of the first waveguide 110. The first polarization rotator 115 is located at a first distance from the first initial point 111 of the section 119 of the first waveguide 110. For instance, the first distance is labeled as "Z-1" and defines the distance between the first initial point 111 and the location of the polarization rotator 115 indicated by line A-A. That is, the distance Z-1 is defined between line S-S and line A-A In general, a polarization rotator rotates the polarization of a signal. For example, a polarization rotator will rotate a TE mode signal to a TM mode signal. Also, a polarization rotator will rotate a TM mode signal to a TE mode signal.

The silicon photonic device 100 includes a second waveguide 120 configured to receive the input signal at a second initial point 121. In one embodiment, the second waveguide 120 comprises silicon. A section 129 of the second waveguide 120 is defined between the second initial point 121 and a second end point 122, and is configured to receive the input signal 105. For example, the input signal 105 is received at the second initial point 121. The section 129 of the second waveguide 120 has approximately the same length X-1 between the second initial point 121 and the second end point 122, also shown between line S-S and line T-T. That is, section 119 of the first waveguide 110 and section 129 of the second waveguide 120 have approximately the same length X-1.

A second polarization rotator 125 is located within the section 129 of the second waveguide 120. The second polarization rotator 125 is located at a second distance from the second initial point 121 of the section 129 of the second waveguide 120. The second polarization rotator 125 is located within the section 120 at the point indicated by the intersection of line B-B with the waveguide 120. As shown, the second distance is the distance between line S-S and line B-B.

In particular, a relative distance between the first distance (between line S-S and line A-A) and the second distance (between line S-S and line B-B) is selectable to achieve a desired phase delay of an output signal from the first waveguide 110 and an output signal from the second waveguide 120. This relative distance is labeled "L-1", and is defined between line A-A and line B-B.

Figure 2:
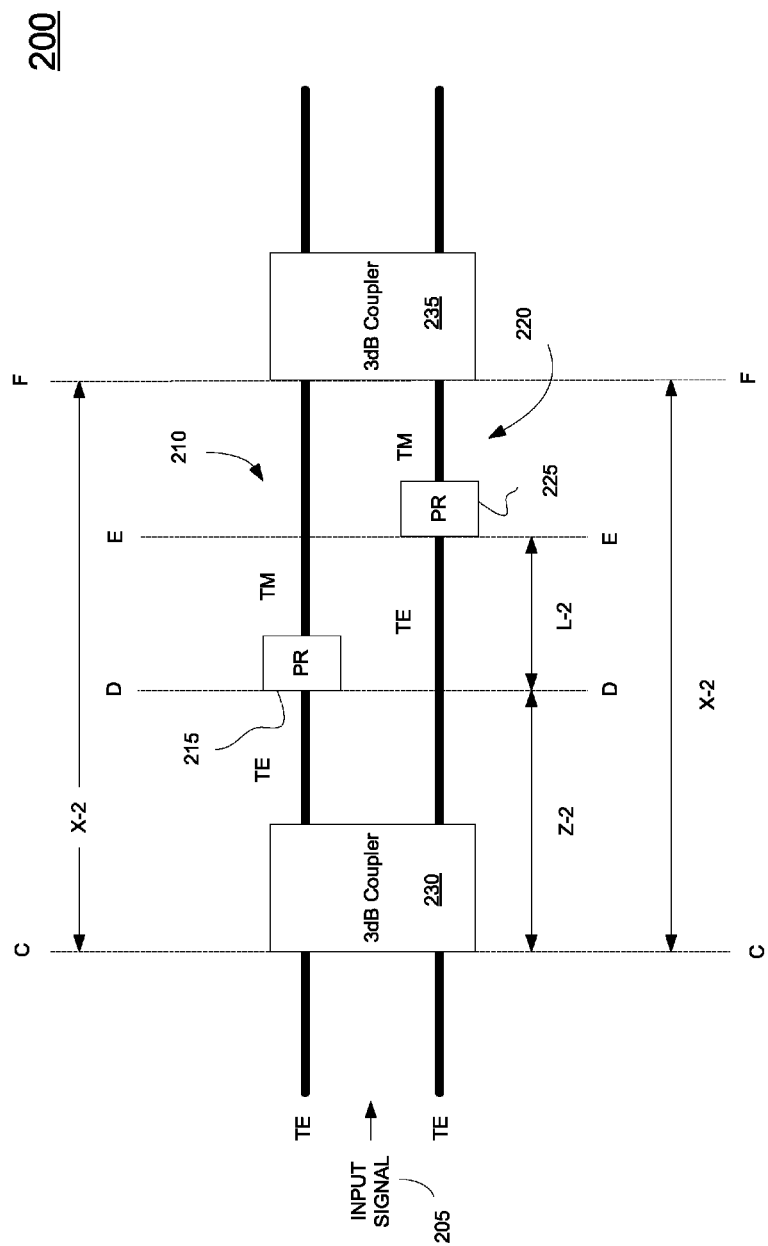
FIG. 2 is an illustration of a silicon photonic device including a two phase waveguide comprising two waveguides each having substantially similar lengths between two 3 dB couplers, wherein the silicon photonic device is configured to be polarization independent, in accordance with one embodiment of the present disclosure.

FIG. 2 is an illustration of a silicon photonic device 200 including a two phase MZI waveguide structure comprising two waveguides each having substantially similar lengths between two 3 dB couplers, in accordance with one embodiment of the present disclosure. The silicon photonic MZI device 200 may be an optical filter, in one embodiment. The waveguides comprise silicon, in one embodiment. The photonic device 200 is polarization independent, or in other words polarization insensitive.

The silicon photonic device 200 includes a first waveguide or MZI phase arm 210 configured to receive an input signal 205 at a first initial point, defined as the input to the 3 dB coupler 230 where line C-C intersects waveguide 210. For example, the input signal 205 has a TE polarization. MZI phase arm 210 is located between 3 dB couplers 230 and 235 and is defined between the first initial point at line C-C and a first end point, defined as the input to the 3 dB coupler 235 where line F-F intersects In addition, the first MZI phase arm 210 has a length X-2 between line C-C and line F-F. Waveguide portions outside of the boundaries set by the 3 dB couplers 230 and 235 are not considered to be part of the MZI phase arm 210.

As shown, 3 dB coupler 230 receives the input signal 205 at the point where line C-C intersects the first MZI phase arm 210. The output to the 3 DB coupler 230 is an attenuated TE signal. That is, between line C-C and Line D-D, the signal has a TE polarization mode. In general, a 3 dB coupler is a device coupling light from one or more inputs and generating multiple outputs (e.g., two outputs) with a 50/50 coupling ratio. For example, the 3 dB coupler can be configured to receive two inputs and output two outputs with a 50/50 coupling ratio, or the 3 dB coupler can be configured to receive one input and output two outputs with a 50/50 coupling ratio.

A first polarization rotator 215 is located within the first MZI phase arm 210. The first polarization rotator 215 is located at a first distance from the first initial point (indicated by line C-C) of the first MZI phase arm 210. For instance, the first distance is labeled as "Z-2" and defines the distance between the first initial point (indicated by line C-C) and the location of the input to polarization rotator 215 (indicated by line D-D). That is, the distance Z-2 is defined between line C-C and line D-D.

In FIG. 2, 3 dB couplers 230 and 235 are configured to receive a first polarization mode (e.g., TE) and/or a second polarization mode (e.g., TM), in one embodiment. That is, in one embodiment, a 3 dB coupler is configured to receive a first polarization mode, and another 3 dB coupler is configured to receive a second polarization mode. In still another embodiment, the 3 dB coupler is configured to receive both first and second polarization modes. The first polarization mode and the second polarization mode are orthogonal. For example, the first polarization can be TE or TM, and the second polarization can be TM or TE, respectively. Though two 3 dB couplers are shown, embodiments of the present invention support more than two 3 dB couplers acting on the signals propagating through the MZI arms 210 and 220. For example, one or more 3 dB couplers may be used to feed MZI phase arms 210 and 220.

In the example provided in FIG. 2, the output of the first polarization rotator 215 is a signal having a TM polarization mode, which propagates to the input of the 3 dB coupler 235 at the first end point of the first MZI phase arm 210 indicated by the intersection of line F-F.

The silicon photonic device 200 includes a second waveguide or MZI phase arm 220 configured to receive an input signal 205 at a second initial point, defined as the input to the 3 dB coupler 230 where line C-C intersects MZI phase arm 220. For example, the input signal 205 has a TE polarization. MZI phase arm 220 is located between 3 dB couplers 230 and 235, and is defined between the first initial point at line C-C and a second end point, defined as the input to the 3 dB coupler 235 where line F-F intersects In addition, the second MZI phase arm 220 has a length X-2 between line C-C and line F-F. Waveguide portions outside of the boundaries set by the 3 dB couplers 230 and 235 are not considered to be part of the MZI phase arm 220. As such, both MZI phase arms 210 and 220, respectively, have a length X-2.

As shown, 3 dB coupler 230 receives the input signal 205 at the point where line C-C intersects the second waveguide of MZI phase arm 220. The output to the 3 DB coupler 230 is an attenuated TE signal, which propagates until reaching the input of the second polarization rotator 225, where line E-E intersects MZI arm 220. That is, between line C-C and line E-E, the signal has a TE polarization mode.

In particular, a second polarization rotator 225 is located within the second MZI arm 220. The second polarization rotator 225 is located at a second distance from the second initial point (indicated by line C-C) of the second MZI arm 220. For instance, the second distance is the sum of Z-2 and L-2, and defines the distance between the second initial point (indicated by line C-C) and the location of the input to polarization rotator 225 (indicated by line E-E. That is, the second distance is defined between line C-C and line E-E.

Importantly, across both MZI arms 210 and 220 in a first portion defined between line C-C and line D-D, and a second portion defined between line E-E and line F-F, the polarization and phase of their respective signals are the same. For example, in the first portion between line C-C and line D-D, both MZI arms 210 and 220 are propagating a TE polarization mode. Since the signals are propagated over the same distance, both signals have the same phase, assuming they have the same phase at line C-C. Also, in the second portion defined between line E-E and line F-F, both MZI arms are propagating a TM polarization mode. Since the signals are propagated over the same distance, both signals have the same phase, assuming they have the same phase at line E-E.

Moreover, an induced phase delay between the two MZI arms 210 and 220 is achieved within a middle portion defined between line D-D and line E-E because the MZI arms 210 and 220 are propagating different polarization modes. The two MZI arms 210 and 220 are approximately identical (e.g., have the same length L-2) except for the location of their respective polarization rotators 215 and 225. Specifically, a relative distance between the two polarization rotators 215 and 225 is defined as the difference between the first distance (between line C-C and line D-D) and the second distance (between line C-C and line E-E) is selectable to achieve a desired phase delay of an output signal from the first MZI arm 210 and an output signal from the second MZI arm 220. This relative distance is labeled "L-2", and is defined between line D-D and line E-E.

The location of the second polarization rotator 225 relative to the location of the first polarization rotator 215 promotes a phase delay over the distance L-2 because of the birefringent nature of the MZI arms 210 and 220. That is, because MZI arm 210 is propagating a TM mode between line D-D and line E-E while MZI arm 220 is propagating a TE mode between line D-D and line E-E, a phase delay between the two MZI arms is introduced. In this case, the phase delay can be decided by Equation 3, as follows:

$$\Delta\phi = \frac{2\pi}{\lambda}|n_{TE} - n_{TM}|L \quad (3)$$

In Equation 3, the phase delay is polarization insensitive. The phase delay is generated by the difference in the refractive index for the two modes, $n_{TE}$ and $n_{TM}$ over the length of the middle portion between line D-D and E-E. That is, since the effective index of TE and TM are different, the location of the polarization rotators will cause the phase delay The central wavelength of the MZI is decided by Equation 4, as follows:

$$|n_{gTE} - n_{gTM}|L = \lambda^2/FSR \quad (4)$$

The length is determinable from Equation 4. That is, since the wavelength is pre-selectable (e.g., by specification), $n_{TE}$ and $n_{TM}$ are known or selectable, and where the variable FSR is desired or targeted, then variable L can be determined. As such, L is based on a specified wavelength of the input signal, a target free spectral range of the input signal, a refractive index of a TE mode of the input signal through the first or second waveguide, and a refractive index of a TM mode of the input signal through the first or second waveguide.

In FIGS. 1 and 2, the two waveguides can also be designed to be temperature insensitive, in other embodiments of the present invention. That is, as temperature varies, their effective refractive index remains constant (e.g., such that dneff/dT is the same or goes to zero). That is, the dΔφ/dT is related to dn/dT of TE and TM (e.g., and/or d(nTE-nTM)/dT), wherein the dn/dT of TE and TM are similar so as their difference goes to zero, then the change in phase delay (dΔφ/dT) also goes to zero. As such, the change in phase delay is temperature insensitive.

In particular, when the width of a silicon waveguide is larger than 1 μm, then the effect of temperature is reduced or minimized. That is, the change in phase delay between the two waveguides in the silicon photonic devices 100 and 200 of FIGS. 1 and 2 remains temperature insensitive.

As such, in one example embodiment, for a silicon waveguide thickness of approximately 0.22 μm, when the width is less than approximately 1 μm, then the phase delay between the two waveguides is polarization insensitive, and the temperature sensitivity is reduced. For example, a two phase waveguide structure has waveguides with similar structure and design, but different locations of respective polarization rotators. In one embodiment, when the width of the waveguide is smaller than 1 μm, the d(nTE-nTM)/dT is reduced. As such, the temperature sensitivity of the phase delay in the two phase waveguide structure is reduced, but not eliminated. The structure remains polarization insensitive.

Figure 3:
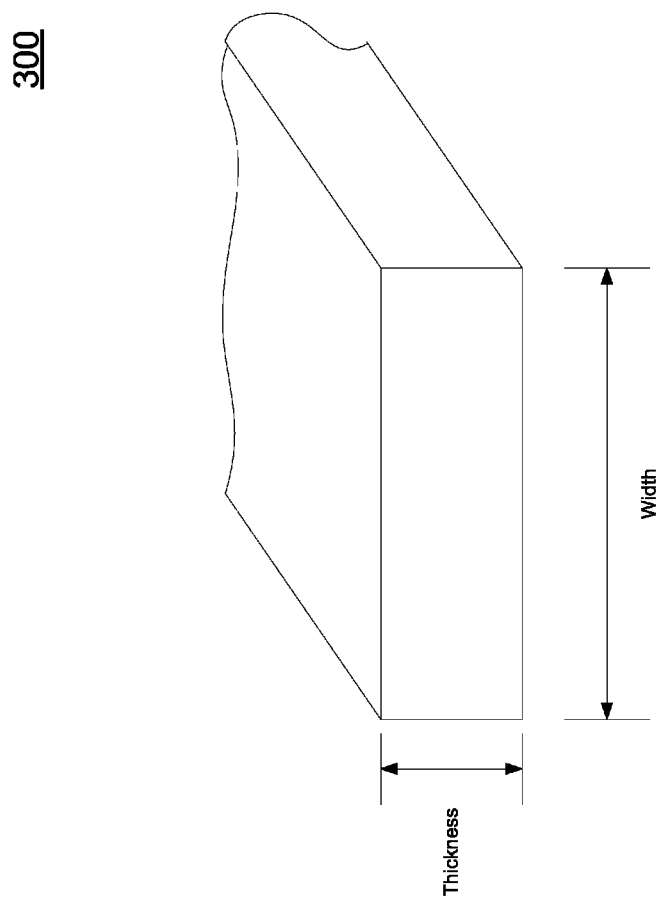
FIG. 3 is a perspective view of a waveguide in a silicon photonic device, in accordance with one embodiment of the present disclosure.

On the other hand, in another example embodiment for a silicon waveguide thickness of approximately 0.22 μm, when the width is larger than approximately 1 μm, then the phase delay between the two waveguides is both polarization insensitive and temperature insensitive. That is, a two phase waveguide structure (e.g., silicon photonic devices 100 and 200) have waveguides with similar designs but different locations of respective polarization rotators. In this case, the dn/dT of TE and TM are the same for wavelength range 1.27 μm-1.35 μm, in one embodiment. As such, the phase delay is polarization insensitive FIG. 3 is a perspective view of an exemplary waveguide 300 in a silicon photonic device, in accordance with one embodiment of the present disclosure. For example, the waveguide 300 may be included within the silicon photonic devices 100 and 200. Waveguide 300 has a thickness and width, both of which extend along the length of the waveguide 300. For waveguides having a width that is greater than approximately 1 μm, the change in phase delay is temperature insensitive, in one embodiment. Waveguide 300 typically is formed adjacent to or on top of an insulator (not shown).

For purposes of illustration only, embodiments of the present invention are described with a silicon on insulator (SOI) thickness corresponding to the silicon waveguide as being approximately 0.22 μm throughout the specification. However, it is understood that the thickness of the SOI can be within a range of thicknesses, such as 0.1 to 0.5 μm, in other embodiments of the present invention. In addition, the width of waveguide 300 and waveguides described throughout the specification can be of any width, and need not be restricted to any range unless specified.

Figure 4:
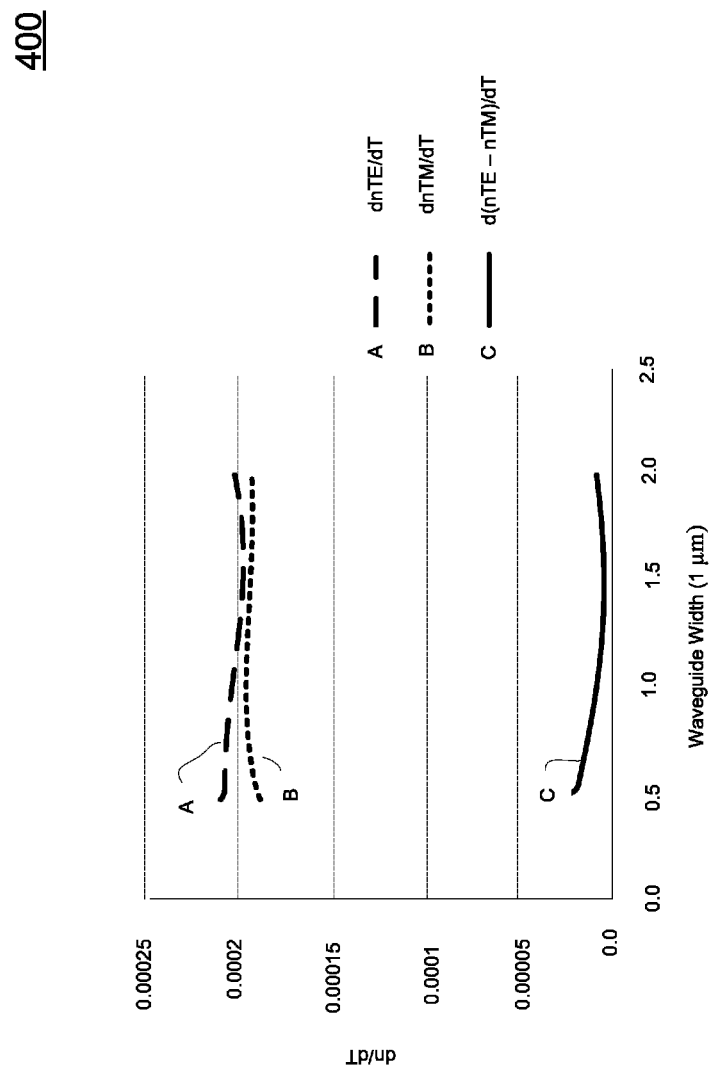
FIG. 4 is a chart illustrating the calculated temperature coefficient of the TE, TM and the difference of the TE and TM modes at a wavelength of 1.31 μm showing temperature insensitivity of a two phase waveguide, in accordance with one embodiment of the present disclosure.

FIG. 4 is a chart 400 illustrating the calculated temperature coefficient of the TE, TM and the difference of the TE and TM modes at an example wavelength of 1.31 μm showing temperature insensitivity of a two phase waveguide, in accordance with one embodiment of the present disclosure. Dotted line A illustrates the effect of temperature on the TE polarization of a signal in the waveguide. Dotted line B illustrates the effect of temperature on the TM polarization of a signal in the waveguide. Solid line C shows the temperature insensitivity of the two phase waveguide, where at widths greater than approximately 1 μm, the dn/dT of TE and TM are the same. As such, the phase delay in the two phase waveguide structure is temperature insensitive.

Figure 5:
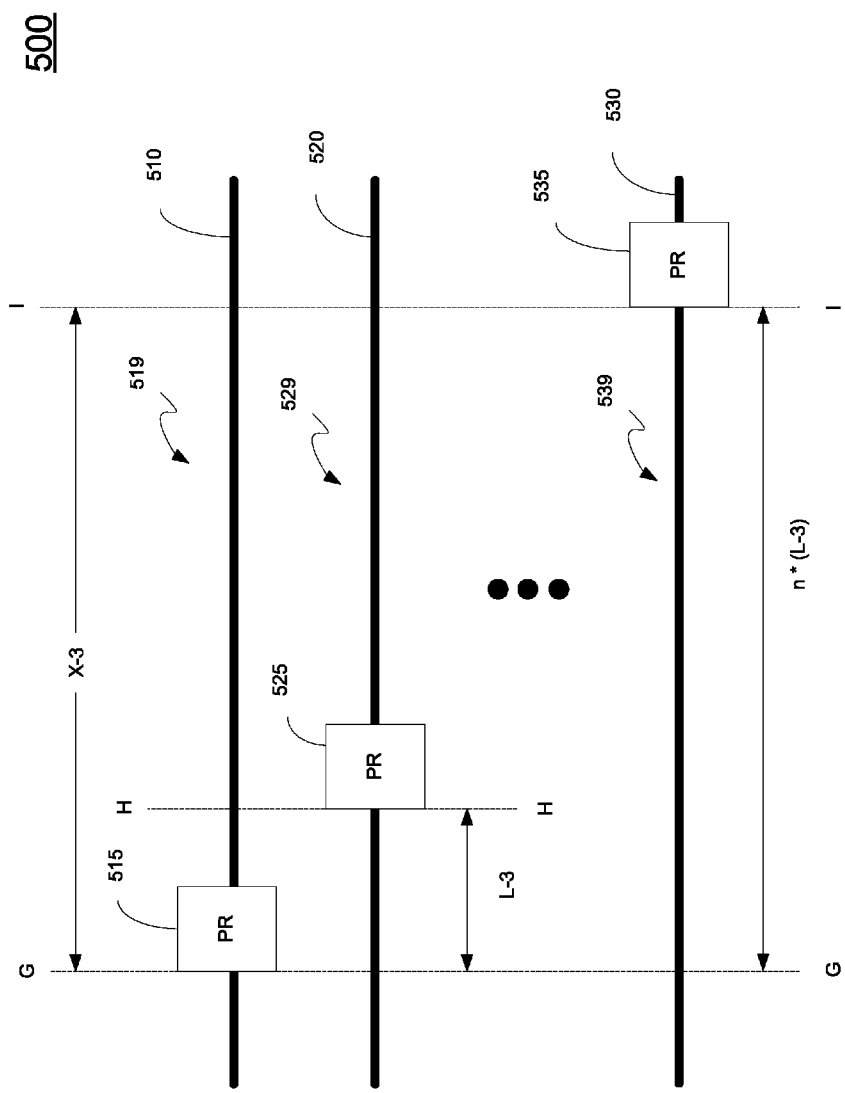
FIG. 5 is an illustration of a waveguide phase array including straight waveguides, wherein the waveguide phase array is temperature insensitive, in accordance with one embodiment of the present disclosure.

FIG. 5 is an illustration of a waveguide phase array 500 (e.g., array waveguide grating) including straight waveguides, wherein the waveguide phase array is polarization insensitive and/or temperature insensitive (or temperature sensitivity reduced), in accordance with one embodiment of the present disclosure. One or more of the waveguides in the array 500 is straight with the same design characteristics. However, the polarization rotators on each of the waveguides have different locations, as will be described below.

The phase array 500 includes a first waveguide 510 configured to receive an input signal (not shown). The input signal is a TE or TM polarization mode. A section 519 of the first waveguide 510 is located between line G-G and line I-I, and has a length labeled as X-3. Section 519 is configured to receive the input signal. A polarization rotator 515 is located within the section 519. For example, the rotator 515 is located in the waveguide 510 at the intersection of line G-G. In one embodiment, the polarization rotator 515 may be located at a distance from an initial point of the section (e.g., line G-G may begin before a location of the polarization rotator 515).

The phase array 500 includes second waveguide 520 configured to receive the input signal. A section 529 of the second waveguide 520 is located between line G-G and line I-I, and has a length labeled as X-3. Section 529 is configured to receive the input signal. A polarization rotator 525 is located within the section 529. For example, the rotator 525 is located in the waveguide 510 at the intersection of line H-H. A relative distance L-3 between the first polarization rotator 515 and the second polarization rotator 525 is selectable to achieve a desired phase delay of an output signal from the first waveguide 510 and an output signal from the second waveguide 520.

The phase array 500 includes an n-th waveguide 530 configured to receive the input signal. A section 539 of the n-th waveguide 530 is located between line G-G and line I-I, and has a length labeled as X-3. Section 539 is configured to receive the input signal. A polarization rotator 535 is located within the section 539. For example, the rotator 535 is located in the waveguide 530 at the intersection of line I-I. A relative distance between the first polarization rotator 515 and the n-th polarization rotator 535 is selectable to achieve a desired phase delay of an output signal from the first waveguide 510 and an output signal from the n-th waveguide 530. In one embodiment, the relative distance is determined by n*(L-3), such that the array 500 is scalable.

In embodiments, phase array 500 is polarization insensitive and/or temperature insensitive. In particular, when the width of the corresponding waveguides are smaller than approximately 1 µm, the waveguides in the array are polarization insensitive, but temperature sensitive reduced. On the other hand, when the width of the corresponding waveguides are larger than approximately 1 µm, then the d(nTE-nTM)/dT goes to zero, or in other words the temperature coefficient of the TE and TM are almost the same, and as such the phase array is temperature insensitive.

In one particular example, in phase array 500, when the thickness of the silicon is approximately 0.22 µm, and the width of the waveguide is smaller than 1 µm, and the d(nTE-nTM)/dT is reduced. As such, the temperature sensitivity is reduced. In another example, when the waveguide width is larger than 1 µm, the temperature coefficient of the TE and TM are almost the same, and as such the phase array is temperature insensitive. In both example, the phase arrays are polarization insensitive, as previously described.

Figure 6:
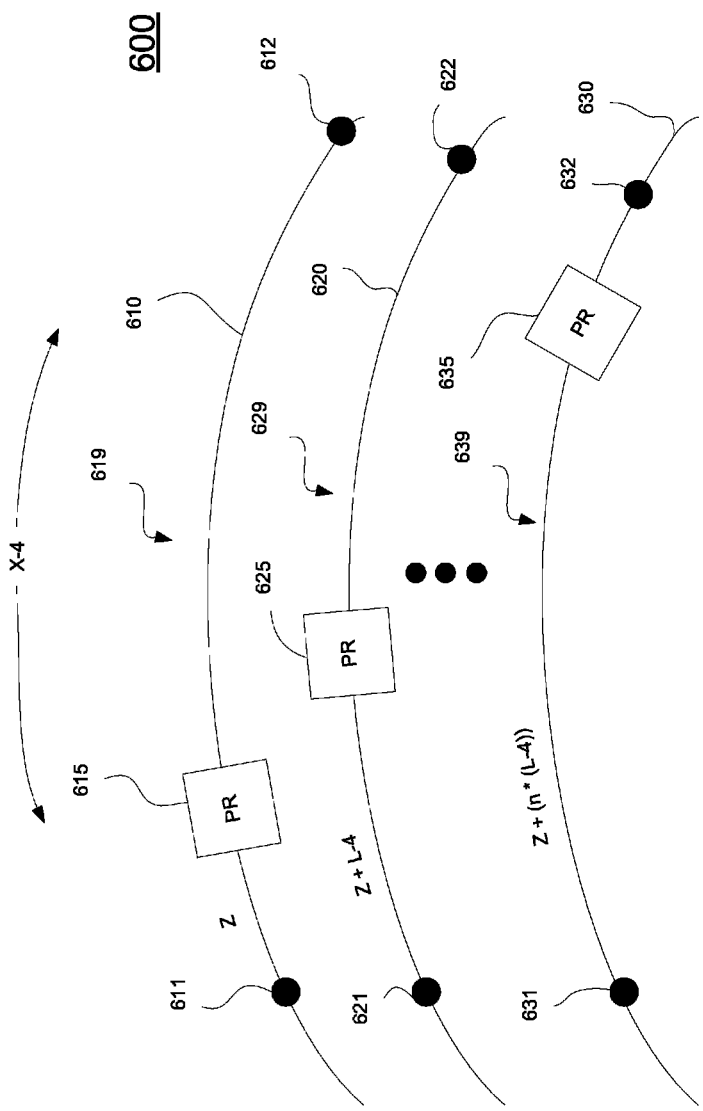
FIG. 6 is an illustration of a waveguide phase array including bent waveguides, wherein the waveguide phase array is temperature insensitive in accordance with one embodiment of the present disclosure.

FIG. 6 is an illustration of a waveguide phase array 600 (e.g., array waveguide grating) including bent waveguides, wherein the waveguide phase array is polarization insensitive and/or temperature insensitive (or temperature sensitivity reduced), in accordance with one embodiment of the present disclosure. One or more of the waveguides in the array 600 is bent with the same design characteristics. However, the polarization rotators on each of the waveguides have different locations, as will be described below.

The phase array 600 includes a first waveguide 610 configured to receive an input signal (not shown). The input signal is a TE or TM polarization mode. A section 619 of the first waveguide 610 is located between a first initial point 611 and a first end point 612, and has a length (e.g., X-4). Section 619 is configured to receive the input signal. A polarization rotator 615 is located within the section 619. For example, the rotator 615 is located in the waveguide 610 at a first distance from the first initial point 611 (e.g., distance Z).

The phase array 600 includes a second waveguide 620 configured to receive the input signal (not shown). A section 629 of the second waveguide 620 is located between a second initial point 621 and a second end point 622, and has the same length (e.g., X-4). Section 629 is configured to receive the input signal. A polarization rotator 625 is located within the section 629. For example, the rotator 625 is located in the waveguide 210 at a second distance from the second initial point 621 (e.g., distance Z+L-4). That is, beginning from the same distance Z, a length L-4 is added before locating polarization rotator 625. As such, a relative distance L-4 between the first polarization rotator 615 and the second polarization rotator 625 is selectable to achieve a desired phase delay of an output signal from the first waveguide 610 and an output signal from the second waveguide 620.

The phase array 600 includes an n-th waveguide 630 configured to receive the input signal. A section 639 is located between an n-th initial point 631 and an n-th end point 632, and has the same length (e.g., X-4). Section 639 is configured to receive the input signal. A polarization rotator 635 is located within the section 639. For example, the rotator 635 is located in the waveguide 630 at an n-th distance from the n-th initial point 631 (e.g., distance Z+(n*(L-4)). That is, beginning from the same distance Z, a length (n*(L-4)) is added before locating polarization rotator 635. As such, a relative distance between the first polarization rotator 615 and the n-th polarization rotator 635 is selectable to achieve a desired phase delay of an output signal from the first waveguide 610 and an output signal from the n-th waveguide 630. The relative distance is determined by (n*(L-4)), such that the array 600 is scalable.

In embodiments, phase array 600 is polarization insensitive and/or temperature insensitive. In particular, when the width of the corresponding waveguides are smaller than approximately 1 µm, the waveguides in the array are polarization insensitive, but temperature sensitive reduced. On the other hand, when the width of the corresponding waveguides are larger than approximately 1 µm, then the d(nTE-nTM)/dT goes to zero, or in other words the temperature coefficient of the TE and TM are almost the same, and as such the phase array is temperature insensitive.

Figure 7:
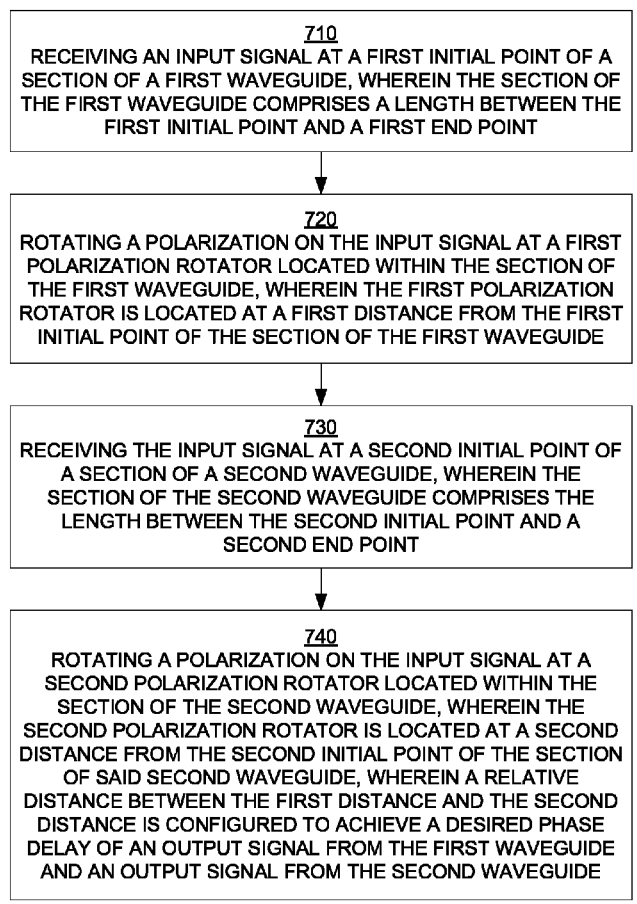
FIG. 7 is a flow chart implementing a polarization independent silicon photonic device including a two phase waveguide, in accordance with one embodiment of the present disclosure.

FIG. 7 is a flow chart implementing a polarization independent silicon photonic device including a two phase waveguide, in accordance with one embodiment of the present disclosure. In particular, at 710, the method includes receiving an input signal at a first initial point of a section of a first waveguide, wherein the section of the first waveguide comprises a length between the first initial point and a first end point. At 720, the method includes rotating a polarization on the input signal at a first polarization rotator located within the section of the first waveguide, wherein the first polarization rotator is located at a first distance from the first initial point of the section of the first waveguide. At 730, the method includes receiving the input signal at a second initial point of a section of a second waveguide, wherein the section of the second waveguide comprises the length between the second initial point and a second end point. At 740, the method includes rotating a polarization on the input signal at a second polarization rotator located within the section of the second waveguide, wherein the second polarization rotator is located at a second distance from the second initial point of the section of the second waveguide. In particular, a relative distance between the first distance and the second distance is configured to achieve a desired phase delay of an output signal from the first waveguide and an output signal from the second waveguide Thus, according to embodiments of the present invention, polarization insensitive and/or temperature insensitive phase delay silicon waveguide structures are disclosed.

While the foregoing disclosure sets forth various embodiments using specific block diagrams, flow charts, and examples, each block diagram component, flow chart step, operation, and/or component described and/or illustrated herein may be implemented, individually and/or collectively. In addition, any disclosure of components contained within other components should be considered as examples because many other architectures can be implemented using the inventive principles described herein. For example, for clarity most switches and pass gates have been illustrated with N-channel devices. With the appropriate logic control, P-channel devices could be used instead or in addition.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Embodiments according to the invention are thus described. While the present disclosure has been described in particular embodiments, it should be appreciated that the invention should not be construed as limited by such embodiments, but rather construed according to the below claims.

What is claimed:

1. An apparatus, comprising:
   a section of a first waveguide configured to receive an input signal at a first initial point, wherein said section of said first waveguide having a length between said first initial point and a first end point;
   a first polarization rotator located within said section of said first waveguide, wherein said first polarization rotator is located at a first distance from said first initial point of said section of said first waveguide;
   a section of a second waveguide configured to receive said input signal at a second initial point, wherein said section of said second waveguide having said length between said second initial point and a second end point; and
   a second polarization rotator located within said section of said second waveguide, wherein said second polarization rotator is located at a second distance, different from said first distance, from said second initial point of said section of said second waveguide;
   wherein a relative distance between said first distance and said second distance is configured to achieve a desired phase delay of an output signal from said first waveguide and an output signal from said second waveguide.

2. The apparatus of claim 1, wherein said relative distance is based on a specified wavelength and a target free spectral range.

3. The apparatus of claim 1, wherein said input signal comprises a transverse electric (TE) mode.

4. The apparatus of claim 1, wherein said input signal comprises a transverse magnetic (TM) mode.

5. The apparatus of claim 1, wherein said apparatus comprises a silicon photonic device, wherein said section of said first waveguide comprises silicon, and said section of said second waveguide comprises silicon.

6. The apparatus of claim 5, wherein a thickness of said silicon of said first and second waveguides is approximately within a range of 0.1 to 0.5 micrometers.

7. The apparatus of claim 1, wherein said section of said first waveguide is straight.

8. The apparatus of claim 1, wherein said section of said first waveguide includes a non-straight portion.

9. An apparatus, comprising:
   a section of a first waveguide configured to receive an input signal at a first initial point, wherein said section of said first waveguide having a length between said first initial point and a first end point;
   a first polarization rotator located within said section of said first waveguide, wherein said first polarization rotator is located at a first distance from said first initial point of said section of said first waveguide;
   a section of a second waveguide configured to receive said input signal at a second initial point, wherein said section of said second waveguide having said length between said second initial point and a second end point;
   a second polarization rotator located within said section of said second waveguide, wherein said second polarization rotator is located at a second distance from said second initial point of said section of said second waveguide;
   a middle section of said first waveguide propagates a first polarization mode and a middle section of said second waveguide propagates a second polarization mode, wherein a length of said middle section is defined by a relative distance between said first distance and said second distance and is selectable to achieve a desired phase delay of an output signal from said first waveguide and an output signal from said second waveguide;

a first 3dB coupler coupled to said first waveguide at said first initial point and coupled to said second waveguide at said second initial point; and a second 3dB coupler coupled to said first waveguide at said first end point, and coupled to said second waveguide at said second end point.

10. The apparatus of claim 9, wherein said relative distance is based on a specified wavelength and a target free spectral range.

11. The apparatus of claim 10, wherein said second polarization mode comprises a transverse electric (TE) mode.

12. The apparatus of claim 10, wherein said first polarization mode comprises a transverse magnetic (TM) mode.

13. The apparatus of claim 9, wherein said apparatus comprises a silicon photonic device, wherein said section of said first waveguide comprises silicon, and said section of said second waveguide comprises silicon.

14. The apparatus of claim 13, wherein a thickness of said silicon of said first and second waveguides is approximately between 0.1 and 0.5 micrometers.

15. The apparatus of claim 9, wherein said section of said first waveguide is straight.

16. The apparatus of claim 9, wherein said section of said first waveguide includes a non-straight portion.

17. A method comprising:
receiving an input signal at a first initial point of a first section of a first waveguide, wherein said first section of said first waveguide comprises a length between said first initial point and a first end point;
rotating a polarization on said input signal at a first polarization rotator located within said first section of said first waveguide, wherein said first polarization rotator is located at a first distance from said first initial point of said first section of said first waveguide;
receiving said input signal at a second initial point of a second section of a second waveguide, wherein said second section of said second waveguide comprises said length between said second initial point and a second end point; and
rotating a polarization on said input signal at a second polarization rotator located within said second section of said second waveguide, wherein said second polarization rotator is located at a second distance from said second initial point of said second section of said second waveguide;
wherein a relative distance between said first distance and said second distance is configured to achieve a desired phase delay of an output signal from said first waveguide and an output signal from said second waveguide, and
a first portion defined between said first initial point and the location of an input to the first polarization rotator and a second portion defined between the location of an input to the second polarization rotator and said second end point have a same polarization and phase of respective signals.

18. The method of claim 17, wherein said relative distance is based on a specified wavelength and a target free spectral range.

19. The method of claim 17, wherein at least one of said section of said first waveguide and said section of said second waveguide is straight.

20. The apparatus of claim 17, wherein at least one of said section of said first waveguide and said section of said second waveguide is non-straight.

\* \* \* \* \*